United States Patent
Zhu

(10) Patent No.: US 12,122,632 B1
(45) Date of Patent: Oct. 22, 2024

(54) CONSUMABLE REWINDING DEVICE AND 3D PRINTING APPARATUS

(71) Applicant: Shenzhen Chengdaqi Technology Co., Ltd., Shenzhen (CN)

(72) Inventor: Zaiqun Zhu, Shenzhen (CN)

(73) Assignee: Shenzhen Chengdaqi Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/433,496

(22) Filed: Feb. 6, 2024

(30) Foreign Application Priority Data

Nov. 11, 2023  (CN) .......................... 202323060649.6

(51) Int. Cl.
| | |
|---|---|
| *B65H 49/24* | (2006.01) |
| *B33Y 40/00* | (2020.01) |
| *B65H 49/34* | (2006.01) |

(52) U.S. Cl.
CPC .............. *B65H 49/24* (2013.01); *B33Y 40/00* (2014.12); *B65H 49/34* (2013.01)

(58) Field of Classification Search
CPC ................................ B65H 49/24; B65H 49/34
See application file for complete search history.

(56) References Cited

U.S. PATENT DOCUMENTS

| | | | | |
|---|---|---|---|---|
| 3,472,463 | A * | 10/1969 | Fedor ...................... | B21C 47/22 242/595.1 |
| 6,892,977 | B2 * | 5/2005 | Boone .................. | B65H 16/106 242/596.8 |
| 8,931,724 | B2 * | 1/2015 | Jordan ................... | B65H 49/38 242/595.1 |
| 2019/0127176 | A1 * | 5/2019 | Franklin-Hensler ... | B65H 49/36 |

* cited by examiner

*Primary Examiner* — Sang K Kim
(74) *Attorney, Agent, or Firm* — Bayramoglu Law Offices LLC

(57) ABSTRACT

A 3D printing apparatus includes a consumable spool for winding a consumable. A consumable rewinding device includes: a driving assembly including a driving portion and a rotating shaft, the driving portion being connected to the rotating shaft for providing power to drive the rotating shaft to rotate; and a roller for bearing a consumable spool, the rotating shaft is connected to the roller, and when the rotating shaft drives the roller to rotate, the consumable spool is driven to rotate by a frictional force between the roller and the consumable spool. The 3D printing apparatus and the consumable rewinding device enable the consumable to be rewound around the consumable spool, avoiding the problem of printer jamming due to messy distribution of the consumable, have a simple structure, and is easy to implement.

19 Claims, 5 Drawing Sheets

CONSUMABLE REWINDING DEVICE AND 3D PRINTING APPARATUS

CROSS REFERENCE TO THE RELATED APPLICATIONS

This application is based upon and claims priority to Chinese Patent Application No. 202323060649.6, filed on Nov. 11, 2023, the entire contents of which are incorporated herein by reference.

TECHNICAL FIELD

The present invention relates to the technical field of 3D printing apparatuses, and particularly provides a consumable rewinding device and a 3D printing apparatus.

BACKGROUND

In the technical field of 3D printing, a consumable used in a printing apparatus is usually extracted from a consumable spool by a feeding mechanism and then jetted through a printing apparatus head to build an object. In retrieving the consumable or changing the type of the consumable, a withdrawal action needs to be carried out, i.e., the consumable currently used is withdrawn from a printing head. The consumable withdrawn causes the consumable on the consumable spool to tend to be loose, resulting in jamming during printing and thus affecting stable operation of the printing apparatus. Furthermore, the consumable that has not been used yet is in messy distribution, causing reduced overall neatness of the apparatus.

SUMMARY

An objective of the present invention is to provide an automatic reclaiming device to reclaim a consumable outside a consumable spool that has not been used yet, such that a 3D printing apparatus can operate stably while improving the overall neatness of the printing apparatus.

To achieve the foregoing objective, the present invention provides a consumable rewinding device, including:
  a driving assembly including a driving portion and a rotating shaft, the driving portion being connected to the rotating shaft for providing power to drive the rotating shaft to rotate; and a roller for bearing a consumable spool, wherein
  the rotating shaft is connected to the roller, and when the rotating shaft drives the roller to rotate, the consumable spool is driven to rotate by an acting force between the roller and the consumable spool.

On the basis of the foregoing description, it can be understood by those skilled in the art that in the technical solutions described above in the present invention, the driving portion is connected to the rotating shaft, such that when the driving portion is released from a limit position, the rotating shaft can be driven to rotate; and the roller is connected to the rotating shaft, and the consumable spool is in contact with the roller, such that when the rotating shaft drives the roller to rotate, the consumable spool can rotate reversely to rewind a consumable around the consumable spool. The present invention enables the consumable to be reclaimed, effectively avoiding jamming in the printing apparatus due to messy distribution of the consumable, has a simple structure is, and is easy to implement.

BRIEF DESCRIPTION OF THE DRAWINGS

In order to explain the technical solutions of the present invention more clearly, some embodiments of the present invention will be described below with reference to the accompanying drawings. It should be understood by those skilled in the art that same or similar components or parts are designated with the same reference signs in different figures. The figures of the present invention are not necessarily drawn to scale with respect to one another. In the figures.

LIST OF REFERENCE SIGNS

100. Consumable rewinding device; 110. Driving assembly; 111. Housing; 1111. First housing; 1112. Second housing; 112. Driving portion; 113. Rotating shaft; 1131. First through hole; 114. Block; 1141. Connecting portion; 1142. Guiding portion; 115. Retaining pin; 120. Roller; 121. Roller shaft; 1211. Slot; 1212. Limiting structure; 122. Roller cover; 1221. Protrusion structure; 1222. Fourth locking structure; 123. Friction member; 125. Flange structure; 130. Abutting assembly; 131. Connector; 1311. Mounting hole; 1312. First locking structure; 132. First elastic member; 133. Base; 1331. Second locking structure; 134. Rigid rolling member; 200. 3D printing apparatus; 210. Consumable spool; 220. Consumable bracket; 230. Auxiliary rotating shaft.

DETAILED DESCRIPTION OF THE EMBODIMENTS

It should be understood by those skilled in the art that the embodiments described below are only some of, rather than all of embodiments of the present invention, which are intended to explain the technical principles of the present invention and are not intended to limit the scope of protection of the present invention. On the basis of the embodiments provided by the present invention, all other embodiments obtained by a person skilled in the art without involving any inventive effort shall still fall within the scope of protection of the present invention.

It should be noted that in the description of the present invention, the direction or position relationship indicated by the terms "central", "upper", "lower", "top", "bottom", "left", "right", "vertical", "horizontal", "inner", "outer", etc. are based on the direction or position relationship as shown in the accompanying drawings and are merely intended to facilitate the description, rather than indicating or implying that the device or element referred to must have a particular orientation or be constructed and operated in a particular orientation, and therefore cannot be understood as limiting the present invention. In addition, the terms "first", "second", and "third" are used for descriptive purposes only, and cannot be construed as indicating or implying relative importance.

In addition, it should also be noted that in the description of the present invention, unless otherwise explicitly specified and defined, the terms "mount", "connected", and "connect" should be understood in a broad sense, for example, they may be a fixed connection, a detachable connection, or an integrated connection; may be a mechanical connection or an electrical connection; or may be a direct connection, an indirect connection via an intermediate medium, or internal communication between two elements. For those skilled in the art, specific meanings of the above terms in the present invention may be understood according to specific circumstances.

Figure 1:
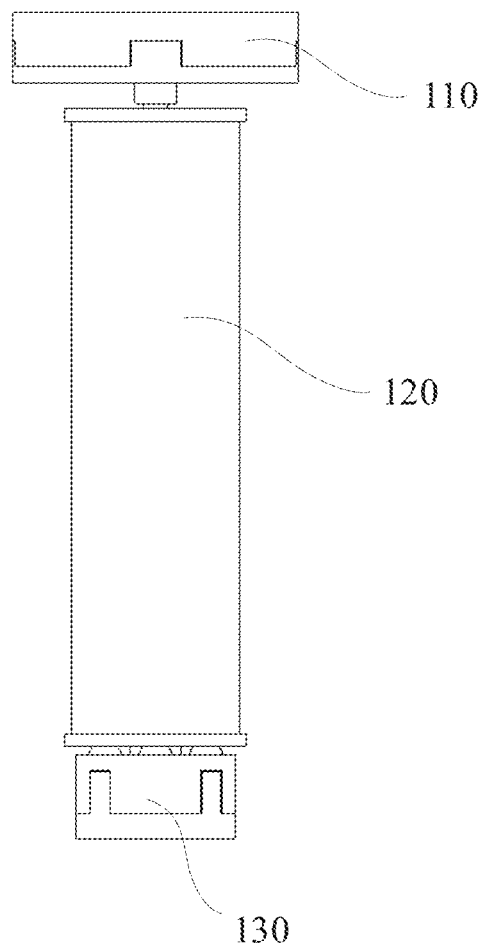
FIG. 1 is a front view of a consumable rewinding device according to some embodiments of the present invention.
Figure 2:
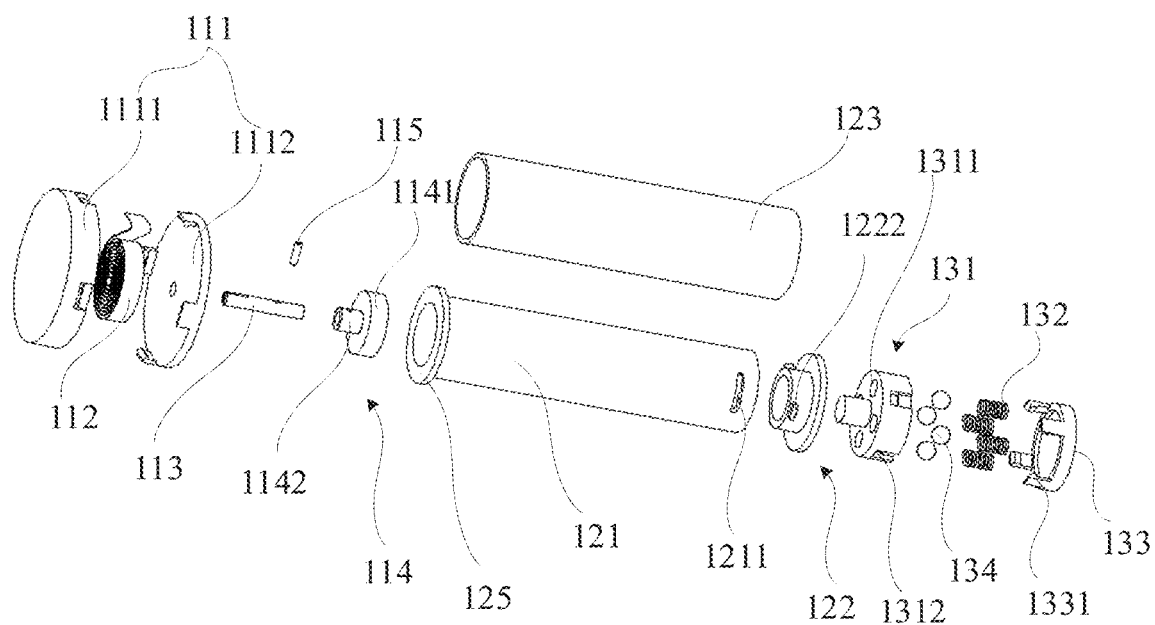
FIG. 2 is a schematic exploded structure diagram of the consumable rewinding device of FIG. 1.
Figure 3:
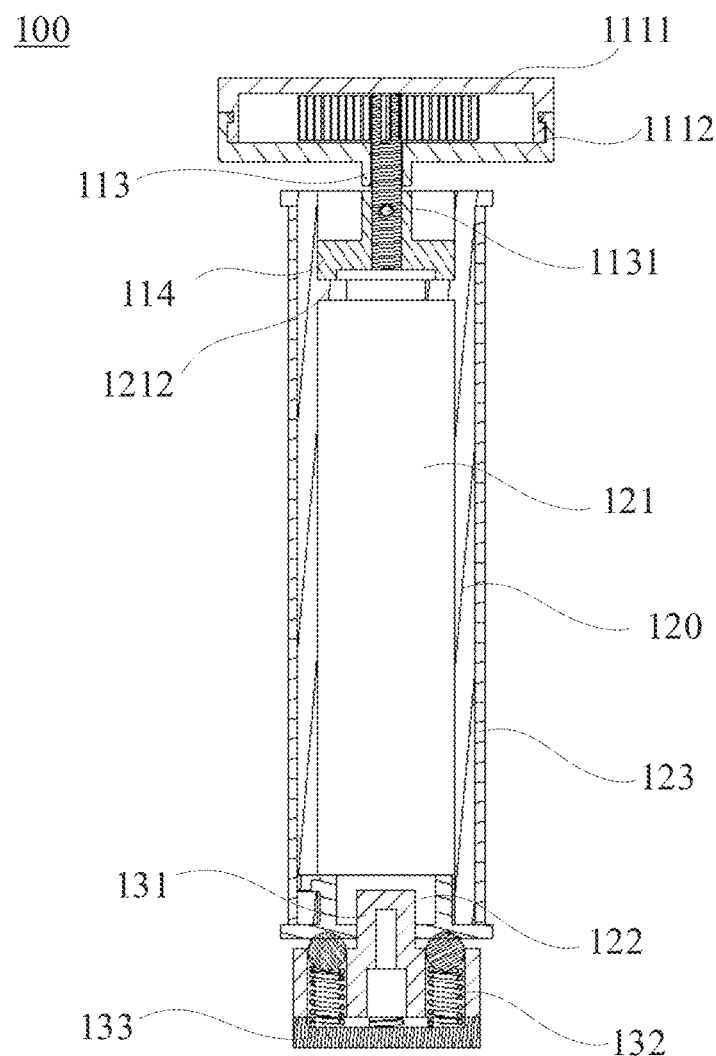
FIG. 3 is a cross-sectional view of the consumable rewinding device of FIG. 1.
Figure 4:
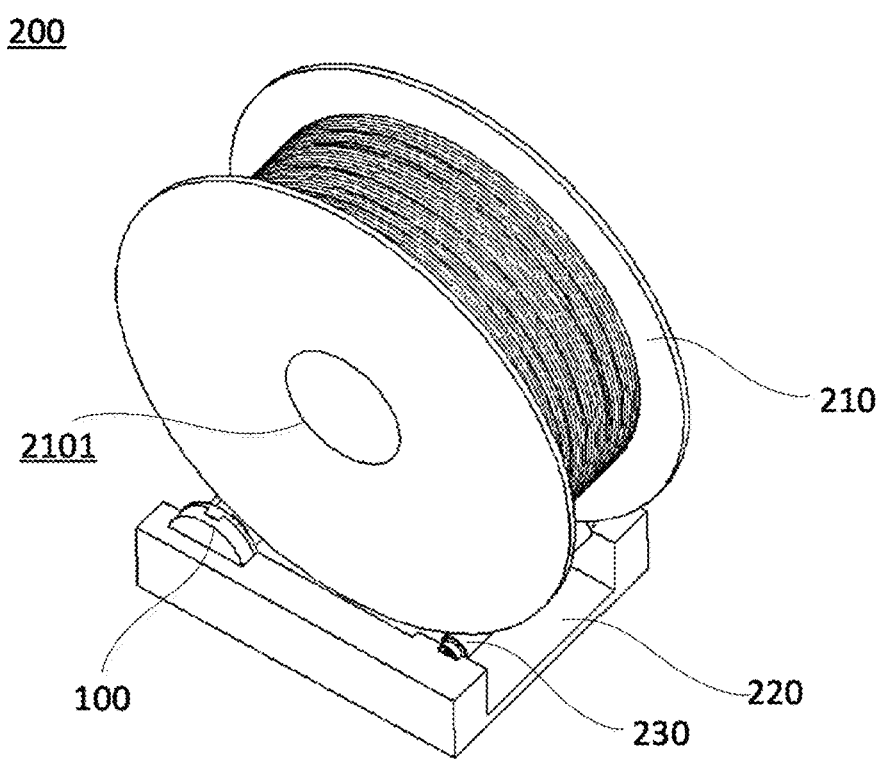
FIG. 4 is a schematic partial structure diagram of a 3D printing apparatus according to some other embodiments of the present invention.
Figure 5:
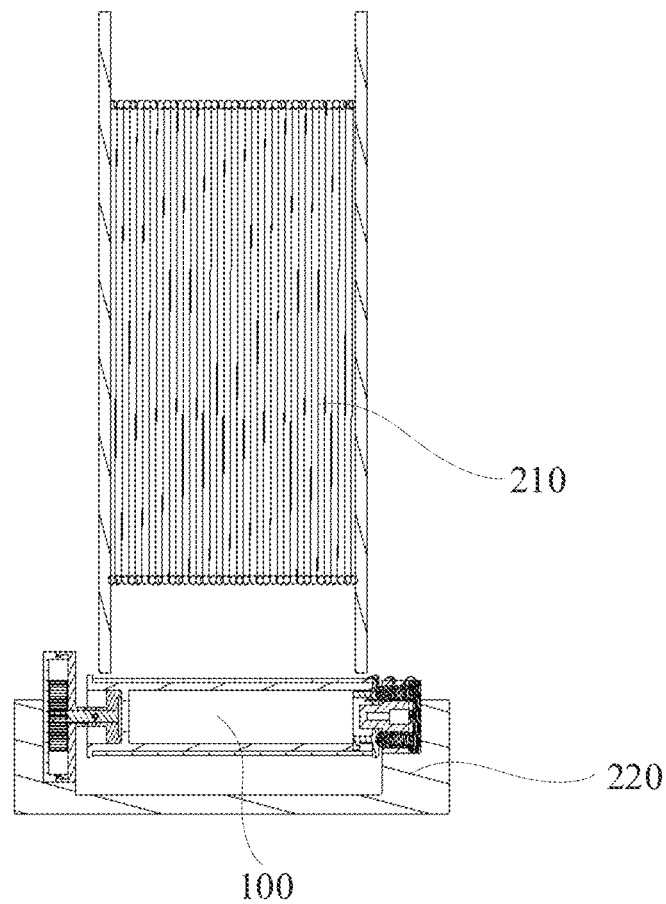
FIG. 5 is a cross-sectional view of the 3D printing apparatus of FIG. 4.

The structure of a consumable rewinding device and a 3D printing apparatus according to some embodiments of the present invention is described in detail below with reference to FIGS. 1 to 5. FIG. 1 is a front view of a consumable rewinding device according to some embodiments of the present invention; FIG. 2 is a schematic exploded structure diagram of the consumable rewinding device of FIG. 1; FIG. 3 is a cross-sectional view of the consumable rewinding device of FIG. 1; FIG. 4 is a schematic partial structure diagram of a 3D printing apparatus according to some other embodiments of the present invention; and FIG. 5 is a cross-sectional view of the 3D printing apparatus of FIG. 4.

It should be noted that, for the convenience of description, and in order to enable those skilled in the art to quickly understand the technical solutions of the present invention, only the technical features that are strongly associated with (directly or indirectly related to) at least one of the technical problems and technical ideas to be solved by the present invention are described hereafter, and the technical features that are weakly associated with at least one of the technical problems and technical ideas to be solved by the present invention are not repeated. Since the technical features weakly associated are common knowledge in the art, even if the present invention does not describe the technical features weakly associated, it will not result in insufficient disclosure of the present invention.

In some embodiments of the present invention, a consumable rewinding device 100 for a 3D printing apparatus 200 consumable is provided for withdrawing a consumable used in the 3D printing apparatus 200 onto a consumable spool 210 while the printing apparatus stops printing or the printing apparatus requires change of the consumable, to avoid jamming during printing due to the loose distribution of the consumable on the consumable spool 210, which otherwise results in the incapability of the printing apparatus to operate. This enables the consumable outside the consumable spool 210 that has not been used yet to be withdrawn onto the consumable spool 210 after the printing apparatus stops printing.

As shown in FIGS. 1 to 3, the consumable rewinding device 100 includes a driving assembly 110 and a roller 120. The driving assembly 110 is connected to the roller 120 for driving the roller 120 to rotate.

The driving assembly 110 includes a housing 111, a driving portion 112, a rotating shaft 113, and a block 114. The driving portion 112 is accommodated within the housing 111, a mounting engagement position is provided in the housing 111, and the driving portion 112 is mounted in the mounting engagement position. The rotating shaft 113 is connected to the driving portion 112, such that when the driving portion 112 is released from a limit position, the rotating shaft 113 can be driven to rotate. The housing 111 includes a first housing 1111 and a second housing 1112, and the rotating shaft 113 can pass through the second housing 1112 and is connected to the roller 120.

In some embodiments, the driving portion 112 may be provided as a coil spring or a torsional spring.

As shown in FIG. 2, in a first embodiment of the present invention, when the driving portion 112 is provided as a coil spring, the mounting engagement position is provided in the first housing 1111, the coil spring is mounted in the mounting engagement position, and a center of the coil spring is fixedly connected to one end of the rotating shaft 113, such that when the coil spring is released from the limit position, the rotating shaft 113 can be driven to rotate. In this embodiment, the coil spring being in the limit position may be achieved by rotation of the consumable spool 210, which specifically includes the following. The 3D printing apparatus 200 starts printing, and an extruder pulls a consumable to feed it into a printing head. Since the consumable is wound around the consumable spool 210, the consumable spool 210 is driven to rotate forwardly when the consumable is fed. There is a frictional force (one of acting forces) between the consumable spool 210 and the roller 120, and the roller 120 rotates as the consumable spool 210 rotates. Further, since the roller 120 is in connection with the rotating shaft 113 for rotation, the roller drives the rotating shaft 113 to rotate and the rotating shaft 113 drives the coil spring to rotate, such that the coil spring is tightened.

It should be noted that the "forwardly" and "reversely" described in the present invention are not forward and reverse rotation directions in the real sense, but are only for a rotation direction of the consumable spool 210 itself. Specifically, a direction in which the consumable spool 210 conveys the consumable is taken as a forward rotation direction of the consumable rewinding device 100, and a direction in which the consumable spool 210 reclaims the consumable is taken as a reverse rotation direction of the consumable rewinding device 100.

The block 114 includes a connecting portion 1141 and a guiding portion 1142, the connecting portion 1141 is configured for connection to the roller 120, and the guiding portion 1142 is connected to the rotating shaft 113. The guiding portion 1142 has a recess, and the rotating shaft 113 is insertable into the recess to fix the rotating shaft 113 and the block 114.

Preferably, the block 114 is provided as a T-shaped frustum structure as a whole.

In some embodiments of the present invention, the driving assembly 110 includes a retaining pin 115, a first through hole 1131 is provided in the rotating shaft 113, and a second through hole is provided in the guiding portion 1142. A first end of the retaining pin 115 is fixed to the first through hole 1131, and a second end of the retaining pin is capable of passing through the second through hole, so as to fixedly connect the rotating shaft 113 to the block 114.

The roller 120 is connected to the rotating shaft 113 such that the rotating shaft 113 drives the roller 120 to rotate.

The roller 120 includes a roller shaft 121 and a roller cover 122. A first end of the roller shaft 121 is connected to the driving assembly 110, and a second end of the roller shaft is connected to the roller cover 122.

A limiting structure 1212 is provided at the first end of the roller shaft 121, and the connecting portion 1141 is connected to the limiting structure 1212 to enable the rotating shaft 113 to drive the roller 120 to rotate.

In some embodiments, the limiting structure 1212 may be provided on an inner side of the roller shaft 121, or provided at an edge of an outer surface of the roller shaft 121. The limiting structure 1212 is made integrally with the roller shaft 121.

In a second embodiment of the present invention, the connecting portion 1141 of the block 114 is fixedly connected to the roller 120. Specifically, the connecting portion 1141 is fixedly connected to the limiting structure 1212 to enable the rotating shaft 113 to drive the roller 120 to rotate. The fixed connection may be provided as threaded hole connection or riveting.

The coil spring is in a limit state in such a way that when a consumable is supplied to the apparatus by means of the consumable spool 210, the consumable spool 210 rotates, and an edge of the consumable spool 210 is in frictional contact with a surface of the roller 120, such that the roller 120 drives the roller shaft 121 to rotate, and since the roller 120 is fixedly connected to the connecting portion 1141, the roller shaft 121 drives the rotating shaft 113 to be in face-to-face contact, this can drive the rotating shaft 113 to rotate and the coil spring is tightened in the limit state. In this case, since the block 114 is fixedly connected to the roller 120, the block 114 and the roller 120 no longer rotate, and there is sliding friction between the consumable spool 210 and the roller 120, that is, the two are in a skid state; and the consumable spool 210 continues to rotate with feeding, and the roller 120 does not rotate with the consumable spool.

In a third embodiment of the present invention, the connecting portion 1141 of the block 114 is movably connected to the roller 120. Specifically, a first end of the connecting portion 1141 is engaged with the limiting structure 1212, and a second end of the connecting portion is abutted against the roller shaft 121.

The coil spring is in a limit state in such a way that when a consumable is supplied to the apparatus by means of the consumable spool 210, the consumable spool 210 rotates, and an edge of the consumable spool 210 is in frictional contact with a surface of the roller 120, such that the roller 120 drives the roller shaft 121 to rotate, and since the roller 120 is abutted against the connecting portion 1141 by means of an abutting assembly 130, the roller shaft 121 is in surface contact with the rotating shaft 113, such that the rotating shaft 113 drives the coil spring to rotate and the coil spring is tightened in the limit state. In this case, since a frictional force between the block 114 and the roller 120 is less than that between the roller 120 and the consumable spool 210, there is sliding friction between the block 114 and the roller 120, that is, the two are in a skid state; and the consumable spool 210 continues to rotate with feeding, and the roller 120 rotates with the consumable spool 210 by the frictional force between the roller and the consumable spool 210.

In this embodiment, as shown in FIGS. 1 to 3, the consumable rewinding device 100 further includes an abutting assembly 130 for abutting the roller 120 against the driving assembly 110. Specifically, the abutting assembly 130 is configured for abutting the roller 120 against the rotating shaft 113, so as to avoid a gap between the roller 120 and the rotating shaft 113, which otherwise results in that a driving force released by the driving portion 112 from the limit position cannot be transmitted to the roller 120, disabling the consumable spool 210 to completely reclaim the consumable that has not been used yet.

The abutting assembly 130 includes a connector 131, first elastic members 132, and a base 133. The connector 131 is connected to the base 133, and there is an accommodating space between the connector 131 and the base 133. Each first elastic members 132 is mounted in the accommodating space in a compressed state to provide a pushing force to the roller shaft 121. Specifically, a first end of the first elastic member 132 is abutted against the base 133, and a second end of the first elastic member is abutted against the connector 131.

The first elastic member 132 may be provided as a spring, a leaf spring, or a disc spring. Preferably, in this embodiment, the first elastic member 132 is provided as a spring.

In some examples of this embodiment, the abutting assembly 130 further includes rigid rolling members 134, wherein the rigid rolling members 134 are located between the first elastic members 132 and the connector 131, and the rigid rolling members 134 are configured for rolling contact with the roller shaft to convert sliding friction between the connector 131 and the roller shaft 121 into rolling friction to ensure that the roller 120 can operate stably. Specifically, the connector 131 is provided with mounting holes 1311 for the rigid rolling members 134, and the rigid rolling members 134 may be mounted within the mounting holes 1311.

Preferably, the rigid rolling member 134 is provided as a steel ball.

The abutting assembly 130 may be connected to the roller 120, or connected to the driving assembly 110, and its implementation includes at least the following two examples.

In a fourth embodiment of the present invention, with continued reference to FIGS. 1 to 3, the abutting assembly 130 is connected to the roller 120, that is, the driving assembly 110, the roller 120, and the abutting assembly 130 are connected sequentially. Specifically, in this example, the roller cover 122 is configured for closing the roller shaft 121 and is fixedly connected to the abutting assembly 130, a first end of the connector 131 is connected to the roller cover 122, and a second end of the connector is fixedly connected to the base 133.

In some examples of this embodiment, slots 1211 are provided at an end of the roller shaft 121 close to the abutting assembly 130, protrusion structures 1221 are provided at an edge of the roller cover 122, and the protrusion structures 1221 are engaged with the slots 1211 to fixedly connect the roller shaft 121 to the roller cover 122.

It should be noted that, in this example, the roller 120 may not be provided with the roller cover 122, and the roller shaft 121 may be directly connected to the abutting assembly 130, such that the abutting assembly 130 may abut the roller shaft 121 against the driving assembly 110.

In some other examples of this embodiment, the connector 131 is provided with first locking structures 1312, the base 133 is provided with second locking structures 1331, and the first locking structures 1312 are capable of being engaged with the second locking structures 1331 to fixedly connect the connector 131 to the base 133.

In yet further examples of this embodiment, the connector 131 is provided with third engagement structures (not shown in the figures), and the third engagement structures are engaged with the slots 1211 such that the roller shaft 121 is fixedly connected to the connector 131.

In still further examples of this embodiment, the roller cover 122 is provided with fourth locking structures 1222, and the fourth locking structures 1222 are engaged with the slots 1211 such that the roller shaft 121 is fixedly connect to the connector 131. The roller cover 122 is engaged with the first locking structures 1312 of the connector 131.

In a fifth embodiment of the present invention, the abutting assembly 130 is connected to the driving assembly 110.

It should be noted that, in this example, the driving assembly 110 may not be provided with the housing 111. The driving assembly 110 includes a cover plate, the cover plate is disposed between the driving portion 112 and the roller 120, the cover plate is provided with an engagement position for engagement with the driving portion 112, and the rotating shaft 113 can pass through the cover plate and is connected to the block 114.

Further, a first end of the connector 131 is connected to the base 133, a second end of the connector is connected to the cover plate of the driving assembly 110, and the driving portion 112 is accommodated between the connector 131 and the cover plate. The connector 131 and the cover plate may be fixedly connected together by providing locking structures between the connector 131 and the cover plate.

The present invention further provides a 3D printing apparatus 200, including a consumable rewinding device 100 as described above for a 3D printing apparatus 200 consumable.

In a sixth embodiment of the present invention, as shown in FIG. 4, edges of two ends of the consumable spool 210 are in connection with two ends of the roller 120, such that the consumable spool 210 is driven to rotate reversely by the frictional force between the roller 120 and the consumable spool 210 so as to withdraw the consumable onto the consumable spool 210. Specifically, a flange structure 125 is provided at either end of the roller 120, and the flange structures 125 are abutted against the edges of the two ends of the consumable spool 210 to limit the consumable spool 210 onto the roller cover 122.

In this embodiment, the roller 120 further includes a friction member 123, and the friction member 123 is sleeved on the roller shaft 121 for increasing the frictional force between the consumable spool 210 and the roller 120.

The friction member 123 may be made of a rubber material.

In this embodiment, the 3D printing apparatus 200 further includes a consumable bracket 220, and the consumable rewinding device 100 is mounted on the consumable bracket 220. The consumable bracket 220 as a whole presents a structure with two protruding ends and a recessed middle. Although not shown in the figures, the consumable bracket 220 in this embodiment further includes a first mounting groove. The consumable spool 210 can be mounted within the first mounting groove, and the edges of the consumable spool 210 are abutted against the two ends of the roller 120, allowing for reclaiming of the consumable.

In this embodiment, the 3D printing apparatus 200 further includes an auxiliary rotating shaft 230, the auxiliary rotating shaft 230 is mounted on the consumable bracket 220, and the auxiliary rotating shaft 230 is disposed parallel to the consumable rewinding device 100, such that the auxiliary rotating shaft 230 is capable of cooperating with the consumable rewinding device 100 to drive the consumable spool 210 to rotate. Specifically, the 3D printing apparatus 200 further includes a second mounting groove, and the auxiliary rotating shaft 230 is mounted within the second mounting channel.

Although not shown in the figures, in a seventh embodiment of the present invention, when the driving portion 112 is provided as a torsional spring, and the driving portion 112 further includes a rotating block; a mounting cavity is provided in the rotating shaft 113, and a limiting structure is provided at an opening of an end of the rotating shaft 113 away from the abutting assembly 130; and the torsional spring is deployed on the rotating block in such a way that a first end of the torsional spring is connected to the rotating block and a second end of the torsional spring is connected to the limiting structure, where the rotating block is rotatable in the mounting cavity.

Although not shown in the figures, in some embodiments, the rotating block includes a rotating base plate, a fixing post, and a limiting groove, and the fixing post and the limiting groove are disposed on a side of the rotating base plate away from the abutting assembly. The torsional spring is sleeved on the fixing post in such a way that the first end of the torsional spring is engaged in the limiting groove, and the second end of the torsional spring is connected to the limiting structure. A mounting engagement member is provided on a side of the rotating base plate close to the abutting assembly and is adapted to an external connection structure to fix relative positions of the rotating base plate and the external connection structure. The driving assembly 110 further includes a first housing, the first housing covers an opening of an end of the mounting cavity away from the abutting assembly, and after covering of the first housing, the torsional spring is in a compressed limit state.

The rotating base plate is provided to be disc-shaped as a whole, and an edge of the rotating base plate is in sliding contact with an inner wall of the rotating shaft 113.

In this embodiment, the consumable spool 210 is sleeved on the roller 120.

In this embodiment, the driving assembly 110 is nested inside the roller, and the abutting assembly 130 is abutted against an end of the driving assembly 110 and is connected to the roller (specifically, a snap fit or rotating fit connection may be employed to fix relative positions of the abutting assembly and the roller). In this way, there is a certain frictional force between the abutting assembly and the driving assembly due to abutment, the rotation of the driving assembly can be transmitted to the abutting assembly by this frictional force, and the abutting assembly is in turn fixedly connected to the roller, such that the rotation of the driving assembly can be finally transmitted to the roller. An inner ring 210L of the consumable spool 210 is sleeved on an outer wall of the roller, such that the rotation of the roller drives the consumable spool to rotate, achieving rewinding.

In this embodiment, the 3D printing apparatus 200 further includes a supporting rod (not shown in the figures), and the supporting rod passes through the mounting cavity of the rotating shaft 113 and is fixedly connected to the mounting engagement position.

In this embodiment, a clearance slot is provided in a center of the base 133, and the supporting rod can pass through the clearance slot and is fixedly connected to the mounting engagement position.

In this embodiment, when the consumable spool 210 rotates, a frictional force existing between the inner ring 2101 of the consumable spool 210 and the roller drives the roller to rotate; since the driving assembly 110 is in close contact with the roller by means of the abutting assembly, the rotation of the roller is first transmitted to the abutting assembly that is fixedly connected thereto; and the abutting assembly is in turn in contact connection with the rotating shaft by means of abutment, and a sufficient frictional force is generated due to an abutting force therebetween, such that the rotation transmitted to the abutting assembly can be transmitted to the rotating shaft again, and the rotating shaft is driven to rotate. The rotation of the rotating shaft then drive the rotating base plate to rotate, and the torsional spring that is disposed on the rotating base plate is also tightened accordingly, until the rotating base plate is engaged onto the limiting structure, reaching the limit state. In the limit state, the rotating base plate or the rotating block cannot continue to rotate in an original direction due to obstruction of the limiting structure, and the torsional spring is also compressed to the maximum extent. In this case, when the consumable spool continues to rotate in the original direction, the rotating shaft no longer rotates due to the existence of the limit state, as a result of which relative movement occurs between the rotating shaft and the abutting assembly that are in contact with each other, that is to say, the rotation of the consumable spool drives the roller to rotate, the rotation of the roller then drives the abutting assembly to rotate, and the abutting assembly can no longer drive the rotating shaft to rotate by the frictional force due to the existence of the limit state. That is, in this case, the frictional force cannot overcome an obstructive force generated by limiting in the limit state, such that relative rotation occurs between the abutting assembly and the rotating shaft, that is, the abutting assembly rotates, and the rotating shaft does not rotate.

When the torsional spring is released from the limit state, the rotating shaft 113 is driven to rotate by means of the torsional spring. Since the rotating shaft is in abutment contact with the abutting assembly, there is a sufficient frictional force therebetween (that is to say, the frictional force generated by abutting should be able to achieve the transmission of rotational movement), thereby also driving the abutting assembly to rotate. Since the abutting assembly is fixedly connected to the roller, the roller is also driven to rotate. The roller is in turn in contact with the consumable spool, thereby driving the consumable spool to rotate, i.e., rewinding. Therefore, the rewinding in this case does not require additional active power sources such as electric motors, but only relies on torsional springs or coil springs, greatly reducing cost. Furthermore, the consumable can be reclaimed, avoiding messy distribution of the consumable. The consumable is wound around the consumable spool, which effectively avoids loose consumable and reduced printing efficiency.

Although not shown in the figures, in this embodiment, the consumable rewinding device 100 further includes an adjustable member. A first end of the adjustable member is connected to the roller 120, and a second end of the adjustable member extends in a direction away from the roller 120 and is abutted against the inner ring 2101 of the consumable spool 210. Specifically, an opening is provided in the roller, the adjustable member includes an adjusting rod and a mounting portion, and the adjusting rod is connected to the mounting portion. The mounting portion is capable of passing through the opening and is abutted against the roller shaft 121, and is engaged with an inner wall of the roller. In addition, the roller shaft 121 is provided with an engagement portion, and the engagement portion can be engaged with an edge of the opening.

Although not shown in the figures, in this embodiment, the adjustable member further includes a rotary shaft disposed on the adjusting rod. A shaft hole is provided at either end of the mounting portion, two ends of the rotary shaft pass through the two shaft holes, respectively, and the rotary shaft rotates relative to the shaft holes, such that the adjustable member is rotatable relative to the roller.

Although not shown in the figures, in this embodiment, the adjustable member further includes a second elastic member, a first end of the second elastic member is abutted against the mounting portion, and a second end of the second elastic member is abutted against an inner side of the adjusting rod, such that a distance between the inner ring 2101 of the consumable spool 210 and the roller is adjustable.

It should be noted that the present invention allows different types of consumable spools 210 to be sleeved on the roller by adding the adjustable member, and has good practicability.

Further, the abutting assembly 130 is added to abut the roller 120 against the driving assembly 110, so as to avoid a gap between the driving assembly 110 and the roller 120, which otherwise results in that the roller 120 cannot drive the consumable spool 210 to rotate reversely and a driving force of the driving assembly 110 is reduced. This enables the consumable rewinding device 100 to operate stably on a long term basis.

The present application further includes the following contents.

Embodiment 1: A consumable rewinding device, including: a driving assembly including a driving portion and a rotating shaft, the driving portion being connected to the rotating shaft for providing power to drive the rotating shaft to rotate; and a roller for bearing a consumable spool, wherein the rotating shaft is connected to the roller, and when the rotating shaft drives the roller to rotate, the consumable spool is driven to rotate by an acting force between the roller and the consumable spool.

Embodiment 2: The consumable rewinding device according to Embodiment 1, further including an abutting assembly for abutting the roller against the driving assembly to provide a frictional force for rotation between the roller and the driving assembly.

Embodiment 3: The consumable rewinding device according to Embodiment 1, wherein the driving assembly further includes a block, the block including a connecting portion and a guiding portion; the roller includes a roller shaft, the connecting portion is configured for connection to the roller, and the guiding portion is connected to the rotating shaft; the acting force is a frictional force; and the driving portion is a torsional spring or a coil spring.

Embodiment 4: The consumable rewinding device according to Embodiment 3, wherein a limiting structure is provided at a first end of the roller, and the connecting portion is fixedly connected to the limiting structure to enable the rotating shaft to drive the roller to rotate.

Embodiment 5: The consumable rewinding device according to Embodiment 3, wherein the roller further includes a limiting structure and a roller shaft, a first end of the connecting portion is engaged with the limiting structure, and a second end of the connecting portion is abutted against the roller shaft; and the consumable rewinding device further includes an abutting assembly for abutting the roller shaft against the connecting portion.

Embodiment 6: The consumable rewinding device according to Embodiment 3, wherein the guiding portion has a recess, and the rotating shaft is insertable into the recess to fix the rotating shaft and the block.

Embodiment 7: The consumable rewinding device according to Embodiment 6, wherein a first through hole is provided in the rotating shaft, and a second through hole is provided in the guiding portion; and the driving assembly includes a retaining pin, a first end of the retaining pin being fixed to the first through hole, and a second end of the retaining pin being capable of passing through the second through hole, so as to fixedly connect the rotating shaft to the block.

Embodiment 8: The consumable rewinding device according to Embodiment 7, wherein the abutting assembly further includes a connector, first elastic members, and an base, wherein a first end of the connector is connected to the base, and each first elastic member is mounted between the connector and the base in a compressed state; and a second end of the connector is connected to the roller; or the second end of the connector is abutted against the driving portion.

Embodiment 9: The consumable rewinding device according to Embodiment 8, wherein the abutting assembly further includes rigid rolling members, the rigid rolling members being located between the first elastic members and the roller shaft for rolling contact with the roller shaft.

Embodiment 10: The consumable rewinding device according to Embodiment 2, wherein the roller is configured for contact connection with an outer wheel edge of the consumable spool for rotation.

Embodiment 11: The consumable rewinding device according to Embodiment 2, wherein the roller is configured for extending into an inner ring of the consumable spool to contact with the consumable spool for rotation.

Embodiment 12: The consumable rewinding device according to Embodiment 10, wherein the abutting assembly is connected to the roller; and/or the roller includes a friction member sleeved on the roller shaft, the friction member being used for increasing a frictional force between the consumable spool and the roller.

Embodiment 13: The consumable rewinding device according to Embodiment 11, wherein the abutting assembly is connected to the driving assembly; and/or the driving assembly is nested inside the roller, and the abutting assembly is abutted against the driving assembly and is connected to the roller, so as to transmit rotation of the driving assembly to the roller by a frictional force between the abutting assembly and the driving assembly; and/or the consumable rewinding device further includes an adjustable member, a first end of the adjustable member being connected to the roller, and a second end of the adjustable member extending in a direction away from the roller and being abutted against the inner ring of the consumable spool.

Embodiment 14: The consumable rewinding device according to Embodiment 2, wherein the driving portion is mounted at a first end of the rotating shaft for driving the rotating shaft to rotate; and a second end of the rotating shaft is abutted against the abutting assembly.

Embodiment 15: The consumable rewinding device according to Embodiment 14, wherein the driving portion includes a torsional spring and further includes a rotating block; the rotating shaft has a mounting cavity, and a limiting structure is provided at an opening of an end of the rotating shaft away from the abutting assembly; and the torsional spring is deployed on the rotating block in such a way that a first end of the torsional spring is connected to the rotating block and a second end of the torsional spring is connected to the limiting structure, the rotating block being rotatable within the mounting cavity.

Embodiment 16: The consumable rewinding device according to Embodiment 15, wherein the rotating block includes a rotating base plate, a fixing post, and a limiting groove, the fixing post and the limiting groove being disposed on a side of the rotating base plate away from the abutting assembly; the torsional spring is sleeved on the fixing post in such a way that the first end of the torsional spring is engaged in the limiting groove, and the second end of the torsional spring is connected to the limiting structure; and a mounting engagement member is provided on a side of the rotating base plate close to the abutting assembly and is adapted to an external connection structure to fix relative positions of the rotating base plate and the external connection structure.

Embodiment 17: The consumable rewinding device according to Embodiment 13, wherein an opening is provided in the roller; the adjustable member includes an adjusting rod and a mounting portion, the adjusting rod being connected to the mounting portion; and the mounting portion is capable of passing through the opening and is abutted against the rotating shaft, and is engaged with an inner wall of the roller.

Embodiment 18: The consumable rewinding device according to Embodiment 17, wherein the adjustable member includes a rotary shaft disposed on the adjusting rod; and a shaft hole is provided at either end of the mounting portion, and the rotary shaft correspondingly pass through the shaft holes, such that the adjustable member is rotatable relative to the roller.

Embodiment 19: The consumable rewinding device according to Embodiment 17, wherein the adjustable member further includes a second elastic member, a first end of the second elastic member is abutted against the mounting portion, and a second end of the second elastic member is abutted against an inner side of the adjusting rod, such that a distance between the roller and the inner ring of the consumable spool is adjustable.

Embodiment 20: The consumable rewinding device according to Embodiment 8, wherein the connector is provided with first locking structures, the base is provided with second locking structures, and the first locking structures are capable of being engaged with the second locking structures to fixedly connect the connector to the base.

Embodiment 21: The consumable rewinding device according to Embodiment 8, wherein slots are provided at an end of the roller close to the abutting assembly, the connector is provided with third engagement structures, and the third engagement structures are engaged with the slots such that the roller is fixedly connected to the connector; or the roller includes a roller cover, the roller cover is provided with fourth locking structures, and the fourth locking structures are engaged with the slots such that the roller is fixedly connected to the connector; and the roller cover is engaged with first locking structures 1312 of the connector.

Embodiment 22: A 3D printing apparatus, including a consumable rewinding device of any one of Embodiments 1 to 21, wherein the consumable rewinding device includes an abutting assembly for abutting the roller against the driving assembly to provide a frictional force for rotation between the roller and the driving assembly.

Embodiment 23: The 3D printing apparatus according to Embodiment 22, wherein the 3D printing apparatus further includes a consumable bracket, the consumable rewinding device being mounted on the consumable bracket; and/or the 3D printing apparatus further includes an auxiliary rotating shaft, the auxiliary rotating shaft being mounted on the consumable bracket and being disposed parallel to the consumable rewinding device, such that the auxiliary rotating shaft is capable of cooperating with the consumable rewinding device to drive the consumable spool to rotate.

Embodiment 24: The 3D printing apparatus according to Embodiment 23, further including: a supporting rod, the supporting rod passing through the abutting assembly and a roller shaft and being fixedly connected to the driving assembly 110.

So far, the technical solutions of the present invention have been described in conjunction with a plurality of embodiments above, however, it is easy for those skilled in the art to understand that the scope of protection of the present invention is not limited to these specific embodiments. Those skilled in the art may split and combine the technical solutions in the above embodiments, or may make equivalent changes or substitutions to the relevant technical features without deviating from the technical principles of the present invention, and any changes, equivalent substitutions, improvements, etc. made within the technical ideas and/or technical principles of the present invention will fall within the scope of protection of the present invention.

What is claimed is:

1. A consumable rewinding device, comprising:
   a driving assembly, comprising a driving portion and a rotating shaft, wherein the driving portion is connected to the rotating shaft, the driving portion is configured to provide power to drive the rotating shaft to rotate; and
   a roller, wherein the roller is configured to bear a consumable spool;
   wherein the rotating shaft is connected to the roller, when the rotating shaft drives the roller to rotate, the consumable spool is driven to rotate by an acting force between the roller and the consumable spool,
   the consumable rewinding device further comprises an abutting assembly, wherein the abutting assembly is configured to abut the roller against the driving assembly to provide a frictional force for rotation between the roller and the driving assembly.

2. The consumable rewinding device according to claim 1, wherein
   the roller is configured to contact with an outer wheel edge of the consumable spool for rotation.

3. The consumable rewinding device according to claim 1, wherein
   the roller is configured for extending into an inner ring of the consumable spool for rotation.

4. The consumable rewinding device according to claim 3, wherein
   the abutting assembly is connected to the roller; and/or
   the roller comprises a friction member sleeved on the roller shaft, the friction member is configured to increase a frictional force between the consumable spool and the roller.

5. The consumable rewinding device according to claim 3, wherein
   the abutting assembly is connected to the driving assembly; or
   the driving assembly is nested inside the roller, and the abutting assembly is abutted against the driving assembly and the abutting assembly is connected to the roller, so as to transmit rotation of the driving assembly to the roller by a frictional force between the abutting assembly and the driving assembly.

6. The consumable rewinding device according to claim 5, wherein
   an opening is provided in the roller.

7. The consumable rewinding device according to claim 1, wherein
   the driving portion is mounted at a first end of the rotating shaft for driving the rotating shaft to rotate; and a second end of the rotating shaft is abutted against the abutting assembly.

8. The consumable rewinding device according to claim 7, wherein
   the driving portion comprises a torsional spring and a rotating block; the rotating shaft has a mounting cavity, a limiting structure is provided at an opening of an end of the rotating shaft away from the abutting assembly; and
   a first end of the torsional spring is connected to the rotating block, a second end of the torsional spring is connected to the limiting structure, the rotating block is rotatable in the mounting cavity.

9. A consumable rewinding device, comprising:
   a driving assembly, comprising a driving portion and a rotating shaft, wherein the driving portion is connected to the rotating shaft, the driving portion is configured to provide power to drive the rotating shaft to rotate; and
   a roller, wherein the roller is configured to bear a consumable spool;
   wherein the rotating shaft is connected to the roller, when the rotating shaft drives the roller to rotate, the consumable spool is driven to rotate by an acting force between the roller and the consumable spool, wherein
   the driving assembly further comprises a block, the block comprises a connecting portion and a guiding portion;
   the roller comprises a roller shaft, the connecting portion is configured for connection to the roller, and the guiding portion is connected to the rotating shaft;
   the acting force is a frictional force; and
   the driving portion is a torsional spring or a coil spring.

10. The consumable rewinding device according to claim 9, wherein
    a limiting structure is provided at a first end of the roller, and the connecting portion is fixedly connected to the limiting structure to enable the rotating shaft to drive the roller to rotate.

11. The consumable rewinding device according to claim 9, wherein
    the roller further comprises a limiting structure and a roller shaft, a first end of the connecting portion is engaged with the limiting structure, and a second end of the connecting portion is abutted against the roller shaft; and
    the consumable rewinding device further comprises an abutting assembly for abutting the roller shaft against the connecting portion.

12. The consumable rewinding device according to claim 9, wherein
    the guiding portion has a recess, and the rotating shaft is insertable into the recess to fix the rotating shaft and the block.

13. The consumable rewinding device according to claim 12, wherein
    a first through hole is provided in the rotating shaft, and a second through hole is provided in the guiding portion; and
    the driving assembly comprises a retaining pin, wherein a first end of the retaining pin is fixed to the first through hole, and a second end of the retaining pin is passed through the second through hole, so as to fixedly connect the rotating shaft to the block.

14. The consumable rewinding device according to claim 13, wherein
    the abutting assembly further comprises a connector, first elastic members, and a base, wherein a first end of the connector is connected to the base, the first elastic member is mounted between the connector and the base in a compressed state; and
    a second end of the connector is connected to the roller or the second end of the connector is abutted against the driving portion.

15. The consumable rewinding device according to claim 14, wherein
    the abutting assembly further comprises rigid rolling members, the rigid rolling members being located between the first elastic members and the roller shaft for rolling contact with the roller shaft.

16. The consumable rewinding device according to claim 14, wherein
    the connector is provided with first locking structures, the base is provided with second locking structures, and the first locking structures are engaged with the second locking structures to fixedly connect the connector to the base.

17. The consumable rewinding device according to claim 14, wherein
- slots are provided at an end of the roller close to the abutting assembly, the connector is provided with third engagement structures, and the third engagement structures are engaged with the slots such that the roller is fixedly connected to the connector; or
- the roller comprises a roller cover, the roller cover is provided with fourth locking structures, and the fourth locking structures are engaged with the slots such that the roller is fixedly connected to the connector, and the roller cover is engaged with first locking structures of the connector.

18. A 3D printing apparatus, comprising a consumable rewinding device, wherein
- the consumable rewinding device comprises:
- a driving assembly, comprising a driving portion and a rotating shaft, wherein the driving portion is connected to the rotating shaft, the driving portion is configured to provide power to drive the rotating shaft to rotate; and
- a roller, wherein the roller is configured to bear a consumable spool;
- wherein the rotating shaft is connected to the roller, when the rotating shaft drives the roller to rotate, the consumable spool is driven to rotate by an acting force between the roller and the consumable spool,
- the consumable rewinding device further comprises an abutting assembly, wherein the abutting assembly is configured to abut the roller against the driving assembly to provide a frictional force for rotation between the roller and the driving assembly.

19. The 3D printing apparatus according to claim 18, wherein
- the 3D printing apparatus further comprises a consumable support, the consumable rewinding device is mounted on the consumable support; and/or
- the 3D printing apparatus further comprises an auxiliary rotating shaft, the auxiliary rotating shaft is mounted on the consumable support and the auxiliary rotating shaft is disposed parallel to the consumable rewinding device, the auxiliary rotating shaft is configured to cooperate with the consumable rewinding device to drive the consumable spool to rotate.

* * * * *